United States Patent [19]

Iadarola

[11] Patent Number: 4,729,443
[45] Date of Patent: Mar. 8, 1988

[54] WEIGHING SCALE WITH PROTECTION AND SECONDARY CHECKING SYSTEM

[75] Inventor: Joseph R. Iadarola, Hillsdale, N.J.

[73] Assignee: Colt Industries Inc., New York, N.Y.

[21] Appl. No.: 942,640

[22] Filed: Dec. 17, 1986

[51] Int. Cl.$^4$ .................... G01G 19/02; G01G 21/02
[52] U.S. Cl. .................................. 177/135; 177/179
[58] Field of Search ............................ 177/135, 179

[56] References Cited

FOREIGN PATENT DOCUMENTS 446122  4/1936  United Kingdom ................ 177/135

Primary Examiner—George H. Miller, Jr.
Attorney, Agent, or Firm—Sixbey, Friedman & Leedom

[57] ABSTRACT

A protection and secondary checking system for a weighing scale having a scale platform which is spaced peripherally from a support to form an intervening space. The protection and secondary checking system is supported on both the scale platform and the support but is not connected to either, and includes an elongate resilient body having a central web which extends into the intervening space to orient the body and provide platform checking. A cover and mounting section extends laterally from one longitudinal edge of the web and rests on both the platform and support.

15 Claims, 2 Drawing Figures

WEIGHING SCALE WITH PROTECTION AND SECONDARY CHECKING SYSTEM

TECHNICAL FIELD

The present invention relates to weighing scales generally, and more particularly to a weighing scale having a protection and secondary checking system to enhance scale operation while preventing debris and other elements from reaching the scale mechanism and affecting scale operation.

BACKGROUND ART

Many weighing applications require that weighing scales be provided in locations where severe environmental conditions exist. For example, large truck and railway scales must be installed outdoors where they are subjected to extremes in temperature, the effects of snow and rain, as well as the effects of dirt, debris, and the shock caused by the successive on-loading and off-loading of heavy moving vehicles. Weighing scales are also required to operate effectively in chemical plants where they are subjected to the action of destructive chemicals in both liquid and solid form. Often, in chemical plants, chemical drums and other containers are filled while they are positioned on the scale platform, and any overflow passes over the scale platform and down into the scale mechanism. In refineries, weighing scales may be subjected to the destructive action of oils and other petroleum products, while in granaries the scale mechanisms are adversely affected by dust and debris.

In the past, vehicle weighing scales have included protective units attached to a scale platform which overlie a scale pit of support frame for purposes of protecting the scale mechanism. For example, U.S. Pat. No. 3,610,352 to Eric Laimins discloses a scale platform with resilient metal plates attached along the sides of the platform. These plates transmit loading forces in the normal loading direction to the scale platform and prevent the application to the platform of adverse side loads. Metal plates of this type which are secured to a scale platform and which overlie the support frame for the scale platform do prove effective for some applications, and particularly for applications wherein electronic load cells of the type shown by the Laimins patent are employed. Although metal plates are subject to the corrosive action of both the elements and chemical environments which renders them unsuitable in many instances, they are additionally responsive to temperature extremes which could alter the forces applied to the platform by the plates. With electronic load cells, some of these problems experienced with metal plates may be alleviated for by electrical and mechanical cell adjustments, but with mechanical lever scales, metal plates attached to the scale platform are totally unsuitable. In a lever scale, as the scale linkages wear, the scale platform tends to move down into a scale pit and also to shift in position relative to the pit walls. Some degree of movement is permissible, but with metal plates attached to the scale platform, movement of the platform relative to the pit wall unbalances the forces applied to the platform by the metal plates. Also, with metal plates which are rigidly secured to the scale platform, it is impossible to inspect the area around the platform between the platform and the pit without laboriously removing the metal plates.

In small, indoor scales, such as bathroom scales, it is sometimes feasible to seal the scale platform to the scale frame by means of a circumferential sealing gasket which is secured to both the platform and frame. Such a structure is shown by U.S. Pat. No. 3,187,826 to T. N. Traff, and the resilient seal shown by this patent operates effectively to seal a small scale to a support frame to repel water. In a small bathroom scale, the Traff sealing unit may be quite efficient, but such a structure is not useful for large truck scales or in destructive environments. Ordinary elastic sealing materials would be rapidly destroyed by rocks and stones driven into the material by truck tires in a truck scale, and extremes in temperature or destructive chemicals will cause the material to crack, deteriorate and harden, losing its elasticity.

In an attempt to protect truck scale mechanisms from the elements, it is common for scale users in the field to "rig" protecting units on the scale structure. Common among these is the use of a thick strip of heavy belting material, such as that commonly used in conveyor belts, which is cut and secured to the edge of the scale pit in spaced relation above the scale platform. This belting material is normally secured to the scale pit by steel strips and fasteners which extend into the concrete wall of the pit, and the belting extends out over the space between the edge of the scale platform and the pit. Although the use of such belting does shelter the intervening space between the scale platform and the pit from the elements, snowplows and other vehicles which come into engagement with this material often destroy the belting and injure the wall of the scale pit. Also, as the scale platform settles with wear in the scale linkage and lever system, rocks and other debris are driven into the space between the belting and the scale platform thereby affecting the accuracy of the weight indication provided by the scale. It is impossible to easily remove this protective belting to inspect and clean the area at the periphery of the scale platform.

It is therefore desirable to provide a scale platform with a peripheral structure which bridges the gap between the scale platform and a scale pit or frame. Ideally, this peripheral structure should provide protection for the scale system while also having elasticity so as to cushion both side-to-side movement and end-to-end movement of the scale platform, thereby providing a secondary checking system. The peripheral structure must also be formed to resist high and low temperatures, shock, elevated pressures, thermal expansion, and a variety of chemical compounds and severe environmental conditions. While surviving exposure to these conditions for prolonged periods, the structure must maintain high compressive strength, crush resistance, and other dynamic and elastic properties, including no significant reduction in compressibility.

DISCLOSURE OF THE INVENTION

A primary object of the present invention is to provide a novel and improved weighing scale with a protection and secondary checking system which is effective to protect the scale mechanism against adverse environmental conditions.

Another object of the present invention is to provide a novel and improved weighing scale with a protection and secondary checking system which is highly durable, wear resistant, and virtually unaffected by extreme temperature changes. This system includes a structure which is loosely mounted and supported by the peripheral edge of the scale platform and the surrounding edge of a scale pit or frame and which acts as a secondary checking system to cushion side-to-side movement as well as end-to-end movement of the scale platform. This protection and secondary checking structure may be easily disengaged from the remainder of the scale structure to facilitate inspection and may then be easily replaced.

It is a further object of the present invention to provide a novel and improved weighing scale with a protection and secondary checking unit which is loosely mounted on the periphery of the scale platform and the edge of the scale pit or frame and which bridges the intervening space therebetween. This protection and secondary checking unit prevents the build-up of ice, snow, and debris between the platform and the pit or frame walls which binds the platform and results in inaccurate weighments. It also operates effectively to cushion movement in all directions between the scale platform and the pit wall while permitting the scale platform to change position relative to the pit wall due to wear on the scale lever and linkage mechanism.

A still further object of the present invention is to provide an elongate, unitary, resilient protection and secondary checking unit for use with weighing scales which is substantially T-shaped in cross-section so that a central stem is provided to extend alongside the peripheral edge of a scale platform to perform a cushioning and checking function. This central stem orients a substantially perpendicular protective section which bridges the gap between the scale platform and a supporting frame or pit and which has tapered outer edges that flex downwardly when subjected to force to prevent debris from being driven under the edges of the protective section. The protection and secondary checking unit is preferably a unitary extrusion formed from resilient material having a durometer within a range which will insure that the material is highly flexible, and this material must maintain this flexibility without a significant reduction in compressibility so as not to disturb the scale platform to pit or frame interface. The material must have great abrasion resistance and resistance to degradation in chemical environments, in response to extreme temperature changes, under repeated impact and compression, and in response to the adverse conditions under which many weighing scales are commonly used.

Yet, a further object of the present invention is to provide a novel and improved weighing scale with a protection and secondary checking unit formed as a unitary extruded strip having sufficient resiliency to permit shipment of the strip in compressed form without having the strip remain in a deformed configuration when unpacked. The strip is formed in such a manner that a central section thereof which overlies the space between the scale platform and the scale pit or frame is of maximum strength and rigidity, while the peripheral edges are of maximum flexibility.

These and other objects of the present invention are accomplished by providing a scale platform which is substantially flush mounted with a surrounding pit wall or scale support frame. Thus, the invention is particularly adapted for use in truck weighing applications and in-floor scale applications where adverse environmental conditions prevail. The weighing scale of the present invention includes conventional scale linkages mounted beneath the platform which are protected by a protection and secondary checking unit resting on the peripheral edge portion of the scale platform an the adjoining pit or scale frame surface and which spans the space between the platform and the pit or frame around the entire periphery of the scale platform. This protection and secondary checking unit is an elongated unitary structure which might be formed by extrusion or molding processes and which includes a central web adapted to extend between the scale platform and the surrounding frame or pit wall. This central web is both resilient and flexible so as to provide a secondary checking system for the seal platform against horizontal motion in any direction. The web also must be extremely flexible so that it will adapt to positional shifts in the scale platform caused by linkage wear. The upper edge of this central web joins with a substantially perpendicularly extending protective mounting section which extends laterally from either side of the web. The bottom surface of this protective mounting section is flat, and extends outwardly to outermost edges on either side of the web which are substantially parallel to the web. The upper surface of the protective mounting section tapers from a point of minimum cross-sectional diamension at each outermost edge away from the outermost edge to a point of maximum cross-sectional thickness to form a highly flexible section adjacent each outermost edge of the protective mounting section. This tapered, highly flexible section joins with a substantially flat central section extending on either side of the central web which is of increased cross-sectional thickness and which, with the central web, imparts weight to the unit so that the unit may rest by gravity on the peripheral edge of the scale platform and the upper edge of the scale pit or surrounding frame. Ideally, the protection and secondary checking unit is formed from ethylene-propylene rubber, a co- or terpolymer, having a durometer within the range of from 45–55.

BEST MODE FOR CARRYING OUT THE INVENTION

Figure 1:
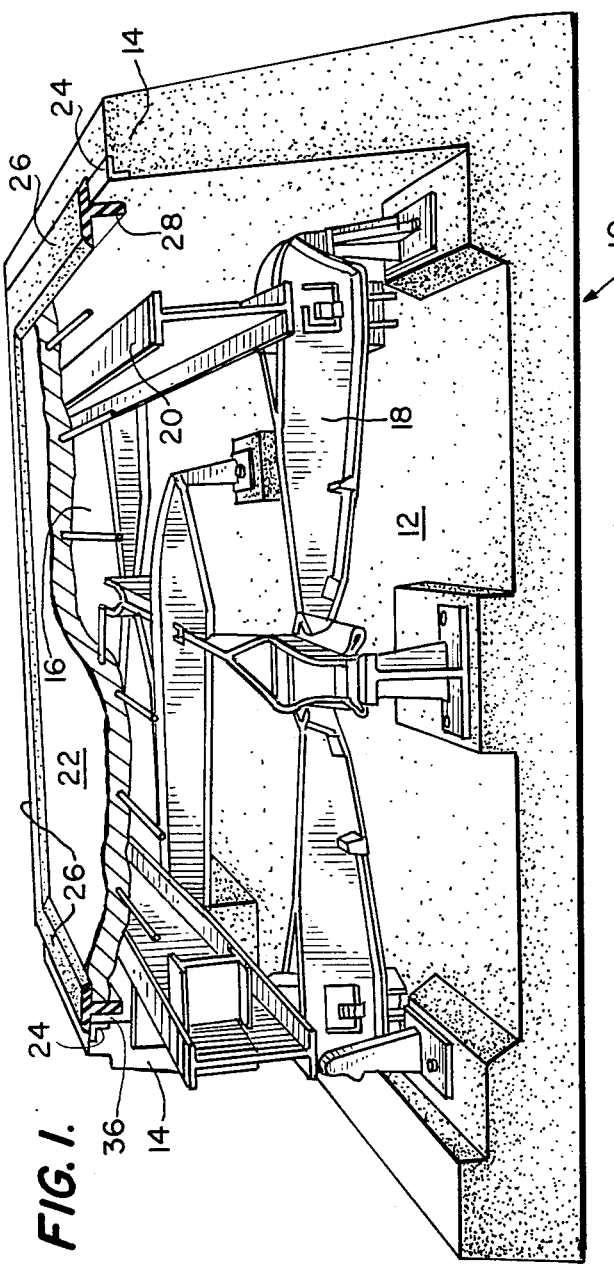
FIG. 1 is a partially sectioned view of a weighing scale with the protection and secondary checking unit of the present invention.

Referring now to FIG. 1, the weighing scale of the present invention illustrated generally at 10, includes a scale pit 12 having side walls 14 and end walls 16, one of which is shown in FIG. 1. Mounted within the scale pit 12 is a conventional lever system 18 which receives force from platform support beams 20 which support a platform 22. The platform 22 is normally mounted so as to be substantially flush with a coping strip 24 which covers the edges of the sidewalls 14 and the end walls 16, and generally the outer edge of the scale platform is spaced from the coping strip 24. This space is necessary if the scale platform is to move freely relative to the scale pit 12, and also if the scale platform is to be permitted to shift position within the scale pit in response to wear of the lever system 18. However, the existence of the space between the scale platform and the scale pit permits debris, chemicals, and other destructive agents to enter this scale pit and adversely affect the operation of the scale while possibly shortening the life of the scale components. Also, rocks, snow, ice and other debris can collect in the space between the scale platform and the scale pit, thereby preventing free operation of the scale platform and resulting in erroneous weighments. Consequently, it is obviously desirable to cover the space between the scale platform 22 and the coping 24 to provide protection to the scale pit while permitting the scale to operate without the accuracy of the scale being adversely affected.

In the past, scale structures incorporating units which might be used to shield the scale pit have failed to meet all of the requirements necessary for such structures to be effective. Since the scale platform 22 shifts position in response to the wear of the lever system 18, any protective unit used must be adapted to compensate for this shift in platform position, and consequently a resilient structure would be preferable. However, conventional elastic materials will not reatin elasticity in radically changing temperature environments while withstanding the action of oil, chemicals, and corrosive agents, plus the wear caused by repeated vehicle passage.

In developing the novel scale 10 of the present invention, it was found that an elastic strip could be structured to form a protective and secondary checking unit 26. This strip may not be attached to either the scale platform 22 or the side walls 14 and 16 of the scale pit 12, but conversely must be formed to be retained in position by gravity. This permits the scale platform 22 to move vertically without being hindered in any manner by the protective and secondary unit 26, and also to permanently alter position in a vertical direction due to wear of the lever system 18. To maintain the protective and secondary checking unit in position, the unit is provided with an elongated central web 28 which extends downwardly and substantially perpendicularly to a mounting and cover section 30. This mounting and cover section projects laterally on either side of the central web 28 and is provided with substantially flat bottom surfaces 32 and 34. One of these flat bottom surfaces engages the coping 24 and the top of the pit wall bearing the coping, while the remaining bottom surface engages the top of the scale platform 22. The central web 28 is designed to extend downwardly into the space 36 between the edge of the scale platform and an adjoining pit wall, and is generally dimensioned to permit some free space to remain as indicated in FIG. 1.

Figure 2:
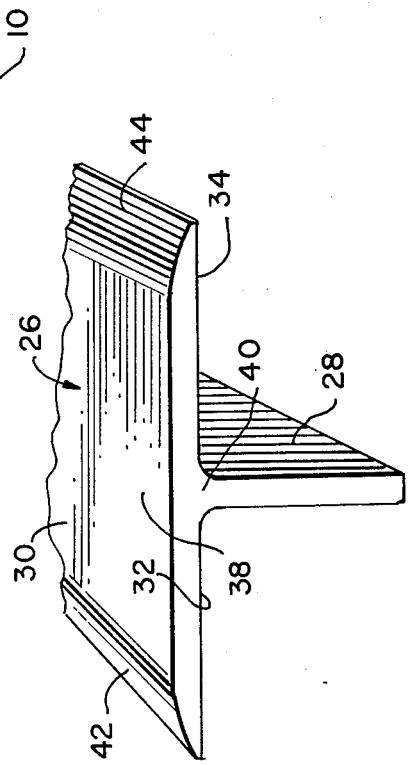
FIG. 2 is a perspective view of a section of the protective and secondary checking unit used with the weighing scale of FIG. 1.

The protection and secondary checking unit 26 must have sufficient weight to insure that the unit will remain in position against the top of the scale platform 22, the coping 24 and the adjacent side wall. Consequently, the web 28 orients the strip and imparts added strength and weight to a central portion of the mounting and cover section 30. As will be noted from FIG. 2, the cross-sectional are of the mounting and cover section is greatest in the central portion 38, and forms, with the central web 28, an area of greatest cross-section at the upper extremity of the central web as indicated at 40. The area 40 is located directly above the space 36, and it is at this point where maximum strength is needed for the protective and secondary checking unit. The weight imparted at this point by the central web 28 added to the weight of the central portion 38 holds the flat mounting surfaces 32 and 34 tightly against the top of the scale platform 22, the coping 24 and the top of the adjacent pit wall. The central web 28 is adapted to lie flat against the side of the scale platform 22, but the scale platform is permitted to freely move in a vertical direction relative to the protective and secondary checking unit 26, and is also free to move in a horizontal direction to a limited extent. Since, the central web 28 is formed of resilient material, the web therefore operates as a secondary checking unit for the platform 22 in all horizontal directions, since this central web extends completely around the extent of the scale platform. Thus, an impact which would normally tend to drive the scale platform against the coping 24 will be absorbed by the central web 28.

At the other extremities of the cover and mounting section 30, are two opposed, spaced, tapered sections 42 and 44 where the upper surface of the mounting and cover section tapers downwardly to meet the flat bottom walls 32 and 34. These tapered outer portions are of maximum flexibility, and are obviously more flexible than the central portion 38. The weight of the web 28 and the central portion 38 holds the flexible tapered portions 42 and 44 tightly against the upper surface of the scale platform 22 and the adjacent pit wall to prevent rocks and debris from being driven under the edges of the cover and mounting unit. Also, the added flexibility of the side portions 42 and 44 permits these portions to be flexed upwardly so that the coping 24 can be inspected without removing the protective and secondary checking unit 26. However, to completely inspect the area between the scale platform and the pit, the entire protective and secondary checking unit may easily be removed from the space 36 and lifted away from the scale platform and then subsequently replaced without the use of tools or requiring the scale platform to be adjusted or disturbed.

The central web 28 must be quite flexible to compensate for positional shifts in the platform 22 without binding against the pit walls, but on the other hand, the entire protection and secondary checking unit must have good elastic memory, so that when the unit is shipped and deformed for shipment, it will spring back to a substantially straight configuration for installation. Units which do not possess such elastic memory and which are subject to deformation during shipment, will cause binding between the scale platform and the pit walls. Consequently, it was necessary to form the protection and secondary checking unit from elastomeric material characterized by a very low specific gravity, high tensile strength, excellent percent elongation, high operating temperature capabilities, low brittle point, very low compression set and high tear strength. Experimentation showed that ethylene-propylene rubber, a co- or terpolymer might provide the desired properties. The composition of most commercial ethylene-propylene rubbers varies from 60 to 85 mole percent ethylene, and the spine of the ethylene/propylene chain is saturated; i.e., there are no double bonds. This absence of carbon-carbon unsaturation makes the rubber inherently resistant to degradation by heat, light, oxygen and ozone. Ethylene/propylene rubbers which include some carbon-carbon unsaturation, include a small amount of an appropriate diene monomer, the terminal double bond of which is active with respect to polymerization, while the internal unsaturation is passive to polymerization but remains in the resulting terpolymer as a branch or pendant substituent location for active sulphor vulcanization. Since the double bond which remains is not in the polymer spine but external to it, the outstanding resistance of ethylene/propylene rubbers to degrading attack by heat, light, oxygen and ozone is inherent in the terpolymer, known as EPDM for ethylene-propylene diene-methylene. Generally, from 4% to 10% by weight of diene is incorporated into EPDM with 4% to 5% by weight generally sufficient to provide a useful product.

It was found that the properties of EPDM could be used to form an effective protective and secondary checking unit 26. A single unitary strip of EPDM can be shaped by extrusion or otherwise to form the unitary protection and secondary checking unit of FIG. 2. For proper elasticity and elastic memory, the EPDM forming the unit should be within a durometer range of between 45 and 55, and the resulting product has great abrasion resistance, static and dynamic temperature resistance, and resistance to degradation in response to oils, chemicals, and other adverse environmental influences. The material remains comformable during a long service life with no significant reduction in compressiblity or flexiblity.

In addition to an effective durometer range, the web 28 will generally range from a cross-sectional width of between 0.25 inch to 3 inches, with the most ideal range being from 0.25 inch to 1 inch. This will insure that a proper checking function is provided by the central web while permitting space to remain between the central web and the scale platform and pit wall for shifts in the scale platform. Thus, the cross-sectional width of the central web 28 should be at least one-half the width of the space 36 between the scale platform 22 and the coping 24 for effective checking to occur while maintaining sufficient scale platform clearance.

It is important for the cover and mounting section 30 to extend laterally outward from the central web 28 for a sufficient distance to insure that the mounting surfaces 32 and 34 are maintained tightly in contact with the scale platform 22, the coping 24 and the top of the pit wall. Consequently, it is necessary for the cover and mounting section to extend outwardly on either side of the central web for at least one inch and preferably in excess thereof, for proper contact to be maintained.

INDUSTRIAL APPLICABILITY

The weighing scale with a protective and secondary checking unit of the present invention may be effectively employed as a pit scale used outdoors for vehicle weighing, stock weighing or other outdoor applications, and the scale is also useful for indoor applications wherein the scale is mounted flush in a floor or similar surrounding supporting frame. Thus, although the present application describes the scale as a pit scale, the pit could be replaced by suitable surrounding framework and the scale could be used in chemical or other destructive environments. The protection and secondary checking unit is formed as a unitary structure and may extend in considerable lengths, and long lengths of this material may be cut to the desired size. The unit may be folded and shipped and possesses sufficient elastic memory so as not to "kink" or otherwise deform permanently during shipping. The central web 28 for the unit not only orients and holds the unit in place on the scale structure, but also provides a secondary checking function to cushion the scale platform against horizontal movement in all directions. The protection and secondary checking unit may be easily mounted on the scale structure without the use of tools, and may be periodically removed and replaced to facilitate scale inspection.

I claim:

1. A weighing scale comprising a support means having spaced end surfaces extending above and away from spaced end walls, said end surfaces being joined by spaced side surfaces extending above and away from spaced side walls, said side and end surfaces extending in substantially the same plane and said side walls joining said end walls to form a platform receiving opening, a scale platform having a top surface adapted to be mounted in said platform receiving opening in spaced relation to said side walls and end walls to create an intervening space therebetween, scale linkage and mounting means secured to said support means below said scale platform and mounting said scale platform for movement into said platform opening in response to weight applied to said scale platform, said scale linkage and mounting means operating to normally mount said scale platform top surface in substantially the same plane as said side and end surfaces, and a protection and secondary checking unit supported by said scale platform top surface and said end and side surfaces, said protection and secondary checking unit including an elongate web extending into said intervening space, said web being a solid web formed of resilient material to permit said web to operate to check movement of said scale platform towards said side and end walls, and a cover and mounting section extending laterally from one end of said webs on either side thereof, said cover and mounting section resting on the top surface of said scale platform on one side of said web and on a side or end surface of said support means on the remaining side of said web, said protection and checking unit extending peripherally around said scale platform and being unattached to both said scale platform and said support means, the web and cover and mounting section being formed as a unitary, solid body of resilient material, and said cover and mounting section includes substantially flat bottom walls extending outwardly from said web, a top wall spaced above said web and said flat bottom walls to define a central portion for said cover and mounting section, and spaced tapered sections on opposite edges of said central portion, said tapered sections each being formed by an inclined surface extending from said top wall downwardly and outwardly to one of said flat bottom walls, said tapered sections being of greater flexibility than said central portion.

2. The scale of claim 1, wherein the cross-sectional width of said web is at least one-half the width of said intervening space.

3. The scale of claim 2, wherein said web and cover and mounting section are formed of elastomeric material of a durometer within the range of from 45 to 55.

4. The scale of claim 3, wherein said elastomeric material is formed of EPDM synthetic rubber.

5. The scale of claim 1, wherein the top wall of said cover and mounting section extends above said web and outwardly therefrom in substantially parallel relationship to said flat bottom walls, said web and cover and mounting section constituting a solid, unitary structure formed of resilient material with said web having an elongate terminal edge spaced from said cover and mounting section and flat, elongate sidewalls extending in substantially parallel relationship from said cover and mounting section to said elongate terminal edge.

6. The scale of claim 5, wherein the cross-sectional area of the cover and mounting section is greatest in the area directly above where said web joins said cover and mounting section.

7. The scale of claim 6, wherein the resilient material forming said web and cover and mounting section is EPDM synhetic rubber of a durometer within the range of from 45 to 55.

8. In a weighing scale having a support means and a scale platform peripherally spaced from said support means to create an intervening space, the invention comprising a protection and secondary checking unit adapted to be removably supported by said scale platform and support means to cover said intervening space and including an elongated, solid body of resilient material having an elongate web portion and a cover and mounting section extending from one end of said web portion and laterally on either side thereof, said cover and mounting section including bottom walls extending outwardly from said web portion, a top wall spaced above said web portion and extending outwardly therefrom in substantially parallel relationship to said bottom walls to define a central portion, and spaced, tapered sections on opposite edges of said central portion, said tapered sections each being formed by an inclined surface extending from said top wall downwardly and outwardly to one of said bottom walls, said tapered sections being of greater flexibility than said central portion, said web portion having an elongate terminal edge spaced from said cover and mounting section and flat, elongate sidewalls extending in substantially parallel relationship from said cover and mounting section to said elongate terminal edge.

9. The protection and secondary checking unit of claim 8, wherein said elongated body of resilient material is formed of EPDM synthetic rubber.

10. The protection and secondary checking unit of claim 9, wherein the resilient material forming said elongated body has a durometer within the range of from 45 to 55.

11. The protection and secondary checking unit of claim 10, wherein said bottom walls each extend outwardly from said web portion for a distance in excess of one inch.

12. The protection and secondary checking unit of claim 8, wherein said bottom walls each extend outwardly from said web portion for a distance in excess of one inch, said elongated body of resilient material being formed of material having an elastic memory which permits such material to be folded without permanent deformation.

13. The protection and secondary checking unit of claim 12, wherein said elongated body is formed of resilient material within the durometer range of from 45 to 55.

14. The protection and secondary checking unit of claim 12, wherein said bottom walls are substantially flat and extend outwardly from said web portion for a distance in excess of one inch and the cross-sectional area of the cover and mounting section is greatest in the area directly above where said web portion joins said cover and mounting secton.

15. The protection and secondary checking unit of claim 14, wherein said elongated body of resilient material is formed of EPDM synthetic rubber having a durometer within the range of from 45 to 55.

* * * * *